US011741264B2

(12) United States Patent
Sprague et al.

(10) Patent No.: US 11,741,264 B2
(45) **Date of Patent: *Aug. 29, 2023**

(54) SECURITY SYSTEMS AND METHODS FOR SOCIAL NETWORKING

(71) Applicant: ESW Holdings, Inc., Austin, TX (US)

(72) Inventors: Steven Sprague, Richmond, MA (US); Michael Sprague, New York, NY (US)

(73) Assignee: ESW Holdings, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/561,809

(22) Filed: Dec. 24, 2021

(65) Prior Publication Data

US 2022/0121780 A1 Apr. 21, 2022

Related U.S. Application Data

(63) Continuation of application No. 16/439,228, filed on Jun. 12, 2019, now Pat. No. 11,244,074, which is a continuation of application No. 15/967,164, filed on Apr. 30, 2018, now Pat. No. 10,331,908, which is a continuation of application No. 14/710,451, filed on May 12, 2015, now Pat. No. 9,990,516, which is a (Continued)

(51) Int. Cl.

| | |
|---|---|
| ***H04L 29/00*** | (2006.01) |
| ***G06F 21/62*** | (2013.01) |
| *H04L 9/40* | (2022.01) |

(52) U.S. Cl.

CPC ........ *G06F 21/6263* (2013.01); *H04L 63/105* (2013.01)

(58) Field of Classification Search

CPC ..... G06F 21/6263; H04L 63/105; Y04S 40/20

See application file for complete search history.

(56) References Cited

U.S. PATENT DOCUMENTS 6,263,313 B1 * 7/2001 Milsted ................ G06Q 20/382 341/51

6,449,721 B1 * 9/2002 Pensak ................. H04L 63/062 726/28

(Continued)

OTHER PUBLICATIONS

Notice of Allowance dated Sep. 23, 2021, filed in U.S. Appl. No. 16/439,228, pp. 1-5.

(Continued)

*Primary Examiner* — Don G Zhao

(57) ABSTRACT

Systems and methods may be provided for masking data on public networks, such as social networking sites. At a publishing node, the system may monitor data input fields in a webpage that are processed by an internet browser. The system may intercept data, such as text, images, and video input at the data input fields, prior to the data being posted online on a public service provider's website. The publishing node may control which users are permitted access to the posted data by defining a policy associated with the data input field. The posted data may be transformed or tokenized to ensure that it is inaccessible to a user (or group of users) unless that user/group is granted access to the decoding key under the policy. In this way, data security and data control may be provided to a publishing user node. Data that has already been posted may be destroyed, for example, by deleting the decryption key or a token.

22 Claims, 14 Drawing Sheets

Related U.S. Application Data continuation of application No. 13/295,686, filed on Nov. 14, 2011, now Pat. No. 9,047,489.

(56) References Cited

U.S. PATENT DOCUMENTS 7,509,384 B1 * 3/2009 Chen ..................... H04L 63/105 709/204
7,529,675 B2 * 5/2009 Maes .................. H04M 3/4938 709/227
RE41,186 E * 3/2010 Pensak .................... H04L 63/10 713/172
8,353,012 B2 * 1/2013 Del Real ............. G06F 21/6218 726/4
8,355,589 B2 * 1/2013 Kim ..................... H04N 19/109 382/233
8,538,020 B1 * 9/2013 Miller ................... H04L 9/0825 380/255
9,047,489 B2 * 6/2015 Sprague .............. G06F 21/6263
9,990,516 B2 * 6/2018 Sprague .............. G06F 21/6263
11,132,464 B2 * 9/2021 Sprague .............. H04L 63/0428
11,288,666 B1 * 3/2022 Hoffman .............. G06Q 20/327
2002/0029340 A1 * 3/2002 Pensak ................ H04L 63/0428 713/182
2002/0078361 A1 * 6/2002 Giroux ................ H04L 63/0428 713/183
2003/0120949 A1 * 6/2003 Redlich ............ C07K 14/70575 726/21
2004/0078595 A1 * 4/2004 Kent, Jr. .............. G06Q 10/107 713/160
2004/0078596 A1 * 4/2004 Kent, Jr. ................. H04L 51/04 713/160
2004/0117220 A1 * 6/2004 Chess .................. G06Q 20/382 705/64
2004/0193606 A1 * 9/2004 Arai ...................... G06F 21/604 707/999.009
2005/0100211 A1 * 5/2005 Gibson .................... G09G 5/06 345/589
2005/0288939 A1 * 12/2005 Peled .................. H04L 63/0245 705/325
2007/0033419 A1 * 2/2007 Kocher ............ G11B 20/00086 713/193
2007/0039050 A1 * 2/2007 Aksenov ............... G06F 16/954 726/22
2008/0016099 A1 * 1/2008 Ikeda ..................... G06Q 90/00 707/999.102
2008/0016143 A1 * 1/2008 Bumpus .............. H04L 41/0226 709/203
2008/0037789 A1 * 2/2008 Motohashi .......... G06F 21/6227 713/193
2008/0066185 A1 * 3/2008 Lester ................... G06F 21/121 726/27
2008/0209533 A1 * 8/2008 Abrams ................ G06F 16/958 707/E17.116
2009/0126022 A1 * 5/2009 Sakaki .................... G06F 21/12 726/25
2009/0158399 A1 * 6/2009 Cooley ................... G06F 21/41 726/4
2009/0228955 A1 * 9/2009 Gibson .................... G09G 5/06 358/1.9
2009/0234876 A1 * 9/2009 Schigel .................. G06Q 30/02 707/999.102
2009/0307745 A1 * 12/2009 Inose ..................... G06Q 10/06 726/1
2010/0036779 A1 * 2/2010 Sadeh-Koniecpol ... H04L 63/20 709/224
2010/0205663 A1 * 8/2010 Ward ..................... G06Q 30/02 709/202
2010/0211515 A1 * 8/2010 Woodings ............. G06F 16/258 705/320
2010/0226494 A1 * 9/2010 Lynch ................ H04N 21/8358 380/28
2010/0246827 A1 * 9/2010 Lauter ................... H04L 9/0836 380/278
2011/0004555 A1 * 1/2011 Onda ..................... G06Q 20/40 713/150
2011/0099482 A1 * 4/2011 Koved .................... H04L 67/02 715/741
2011/0119290 A1 * 5/2011 Dhoble .................. G16H 80/00 707/769
2011/0137975 A1 * 6/2011 Das ........................ G06Q 10/10 705/14.66
2011/0167102 A1 * 7/2011 Matzkel .............. G06F 21/6227 709/202
2011/0170692 A1 * 7/2011 Konrad ................. G06F 21/606 380/260
2011/0209193 A1 * 8/2011 Kennedy ................. H04L 63/20 726/1
2011/0219427 A1 * 9/2011 Hito .................... H04L 63/0853 726/3
2011/0252118 A1 * 10/2011 Pantos .................. G06F 3/0484 709/219
2011/0289579 A1 * 11/2011 Davis .................... H04L 67/565 726/26
2011/0307695 A1 * 12/2011 Slater .................. G06F 21/6227 713/163
2012/0023332 A1 * 1/2012 Gorodyansky ....... H04L 63/105 713/168
2012/0069131 A1 * 3/2012 Abelow ............ G06Q 30/0601 345/589
2012/0109836 A1 * 5/2012 Chen ....................... H04L 41/00 705/319
2012/0110680 A1 * 5/2012 Oliver ................... H04L 63/102 726/30
2012/0137122 A1 * 5/2012 Lu ...................... H04N 21/2362 713/150
2012/0163598 A1 * 6/2012 Wang .................... H04L 63/061 380/259
2012/0185791 A1 * 7/2012 Claussen .............. G06Q 10/063 715/772
2012/0204032 A1 * 8/2012 Wilkins .............. H04L 63/0428 713/170
2012/0216133 A1 * 8/2012 Barker .................. G06F 21/629 715/760
2012/0246701 A1 * 9/2012 Swamy ................. G06F 21/562 726/4
2012/0278622 A1 * 11/2012 Lesavich ............... G06F 16/958 713/168
2012/0311658 A1 * 12/2012 Dozier .................... H04L 63/20 726/1
2012/0324242 A1 * 12/2012 Kirsch ................ G06F 21/6245 713/189
2013/0125201 A1 * 5/2013 Sprague .............. G06F 21/6263 726/28
2013/0125202 A1 * 5/2013 Sprague ................ H04L 63/105 726/1
2013/0125247 A1 * 5/2013 Sprague .............. G06F 21/6263 726/28
2014/0089780 A1 * 3/2014 Garcia-Martinez .......................... G06Q 30/0631 715/234

OTHER PUBLICATIONS

Response to Final Office Action dated Sep. 23, 2021, filed in U.S. Appl. No. 16/439,228, p. 1.
Terminal Disclaimer—Filed dated Sep. 10, 2021, filed in U.S. Appl. No. 16/439,228, pp. 1-2.
Terminal Disclaimer—Approved dated Sep. 10, 2021, filed in U.S. Appl. No. 16/439,228, p. 1.
Response to Final Office Action dated Sep. 9, 2021, filed in U.S. Appl. No. 16/439,228, pp. 1-10.
Final Office Action dated May 10, 2021, filed in U.S. Appl. No. 16/439,228, pp. 1-16.
Response to Non-Final Office Action dated Apr. 28, 2021, filed in U.S. Appl. No. 16/439,228, pp. 1-7.

(56) References Cited

OTHER PUBLICATIONS

Non-Final Office Action dated Oct. 28, 2020, filed in U.S. Appl. No. 16/439,228, pp. 1-13.

* cited by examiner

FIG. 9 p.s. Every once in a while, the upload may fail because the mobile operator drops the Internet connection. Please try to upload again and it should work. Good day

900

Posted by Abaqus Team on December 11, 2008 at 03:49 PM in Tips | Permalink
Digg This | Save to del.icio.us

TRACKBACK

TrackBack URL for this entry:
http://www.typepad.com/services/trackback/6a00e551912f6088340105365cf6b3970c Listed below are links to weblogs that reference Recording your Tracks with Abaqus' GeoRecorder:

COMMENTS

You can follow this conversation by subscribing to the comment feed for this post.

[]abKtf N fqxt bfsy yt rfpj f htrrjsy, ymtzlm N mfaj stymnsl yt xfd{]
Posted by: Michael | August 03

FIG. 10A
FIG. 10B
login
Policy:
Web default
Logout msprague
Policy:
Web default

SECURITY SYSTEMS AND METHODS FOR SOCIAL NETWORKING

BACKGROUND

The evolution of the web has brought content submissions to the forefront of public online services. User submissions including comments, status updates, images, and the like are now commonplace in virtually all public online services, including social networking sites, online news articles, and blogs. A vast majority of material is now provided by end-users rather than webmasters. As a webmaster, one has the ability to modify or remove content at will, or to reserve access to a select community of viewers. An end-user user posting into a web service, however, normally gives up all these rights as soon as the content is uploaded.

Users of a public online service who share content on the site can create serious risks to their own privacy. Not only do social networking site users face privacy concerns with respect to the social network site itself having access to, and possibly ownership of, content posted by its users, but third party applications and advertisers integrated/linked into the social networking site may also have access to such content. Social networking site APIs can allow integration of third-party software and give third-party developers access to user data. While these open interfaces enable site enhancements, there is an important privacy trade off, which many site users do not appreciate. Thus, social networking sites can pose serious privacy risks to their users by exposing user data to third-party developers and advertisers. To allay fears of privacy violations, some social networking sites provide users with some access control settings to place restrictions on who may view their personal information. The introduction of open APIs to social networks, however, enables such access control preferences to be circumvented, thus making user data vulnerable to data mining and other privacy issues.

SUMMARY

Systems and methods may be provided in which end-users may encode (e.g. encrypt, mask, transform) content posted to a public Internet service. The systems and methods may enable end-users to control a policy that governs access to that content. Private data posted by end-users on public networks, such as social networking sites or publishing sites that allow end-users to post comments, may be encoded by the posting end-user. A browser plugin may be provided on a client system to encode the posted data before it is available online and automatically decode the encoded posts into clear text for those viewers that are granted the key. In this way, data security and data control may be provided for end-user posting online. Access to the posted data may be restricted to a select group of viewers. Data that has already been posted may be destroyed, for example, by deleting the decryption key.

Content, such as a written post or image, is often submitted through a form hosted in a tool such as a web browser. Examples include the comment forms made available with most blogs, the Google Gmail web interface or Facebook.

A privacy agent (or software plugin or engine) may be provided to intercept a post prior to the post being posted/effectuated. In this way, the content to be posted can be intercepted and then encoded/encrypted before it is uploaded and, then decoded/decrypted, according to a given policy, prior to being rendered. No changes are introduced to the network infrastructure or the hosted web service An end-user equipped with the privacy agent may select to encrypt the contents of a specified form field after supplying the content, but before instructing the hosting tool (such as a web browser) to deliver the content to the web service. Along with the instruction to encrypt, the end-user may identify the policy server and policy that will govern the content to be posted. The end-user may have an account with the policy server where he or she may establish, and later modify, content access policies.

The privacy agent may contact the policy server and log in, given the end-user credentials. The indicated policy may be fetched and along with it, the content encryption key. This communication may be cached for re-use or made automatic with device identity as is common in phones.

The privacy agent may encrypt the content and tag it with a recognizable identifier, the address of the policy server, and the policy identifier. This encrypted package may be prepared in a manner that is likely to be accepted by the server. For example, textual content could be rendered into hexadecimal ASCII code surrounded by a header structure. The encrypted content may then be delivered to the web service.

The web service may deliver the encrypted content to a rendering environment likely with no knowledge that it has been altered or needs further processing. However, the same privacy agent running in the rendering environment may parse the content prior to display and identify segments that are to be decrypted by means of the recognizable identifier.

The policy server and policy identifier may be extracted from the content. The policy server may be contacted to request a decryption key. If terms of the policy are satisfied, the decryption key may be delivered to the privacy agent, which may then decrypt the content and replace the encrypted blog with the cleartext. To the end-user rendering the content, this process can be invisible.

Methods and systems for encoding electronic data published by a user node may be provided. Contents of an electronic document may be processed to identify one or more text input fields. In response to detecting text input at a text input field that has been identified in the document, a policy for text input field may be assigned. A unique identifier or tag assigned to the text input field and a key for encoding the text input of the text input field may be obtained. In response to obtaining the unique identifier and the key for encoding the text input, the text input may be encoded by replacing the text input with encoded text.

A policy ID may be determined when assigning the policy that is associated with the text input field. When the text input at the text input field is detected, the policy ID may be transmitted to a policy node. The policy node may be any type of computing system, such as a policy server or a cluster of nodes. The policy node may respond to the receipt of the policy ID by generating a unique identifier assigned to the text input field. The policy node may respond to the receipt of the policy ID by generating a key for encoding the text input at the text input field. The policy node may respond to the receipt of the policy ID by transmitting to the publishing user node, the unique identifier and the key for encoding the text input. The (i) unique identifier assigned to the text input field and (ii) the key for encoding the text at the text input field may be transmitted to the publishing user's node. In another embodiment, the publishing node may generate the key for encoding the text at the text input field.

The text input field in the electronic document (e.g. webpage) may be identified by processing a Document Object Model (DOM) associated with the electronic document. The system may respond to the identification of the text input field by attaching a blur even handler to the text input field.

The text input may be detected at the text input field by the event handler if the event handler detects an event (e.g. change event or blur event). For example, if a value associated with the text input field is modified and the text input field loses focus, then a blur event may be detected. In response to detecting a blur event associated with an input field losing focus, the policy associated with the input field may be determined. The policy may be a set of terms to be satisfied by a viewing user node attempting to access the page (to receive access to a decoded version of the encoded text). If the viewing user node accesses the electronic document and the terms of the policy are not satisfied by the viewing user node, the encoded text may be replaced with error text at the viewing user node. If the terms of the policy specify that the viewing user node is permitted access, the encoded text may be replaced with cleartext.

The error text may be customizable (defined/configured) by the publishing node. The publishing node can specify or select the error text that will appear at the viewing node. The error text can be defined in the terms of the policy. The error text that appears can be configured such that it depends on certain conditions including information known about or provided by the viewing node.

The terms of the policy may define a user (or a group of users) that can be granted access to the cleartext. If the viewing user node is a member of this access group, the viewing user node may be granted access to the cleartext.

The terms of the policy may define a user (or a group of users) which are denied access to the cleartext. If the viewing user node is a member of the access denied group, the viewing user node may be denied access to the cleartext.

The terms of the policy may specify an expiration date for providing access to the cleartext. The terms of the policy may specify a geographic location associated with the point of access/operating location of a viewing user node in which access to the cleartext is granted or denied. The terms of the policy may require a minimum or maximum age of a user associated with the viewing user node to grant/enable access to the cleartext. The terms of the policy may require that the viewing user node be verified as trustworthy by a machine health monitoring system to enable access to the cleartext. The terms of the policy may require that the viewing user node meet a specified level of cryptographic capability in order to protect access and use of the decoding key.

The publishing user node may select, from a plurality of potential policies, which policy is associated with the text input field. The publishing user node may be able to configure its policy selection by selecting a specific style for the text input field. In this way, a particular style may correspond with a particular policy. When a user at the publishing user node makes a selection of a specific style for the text input field, this selection may control which policy is to be associated with that text input field. The style selected may be, for example, background color selection. Thus, a selection of a background color of the text input field may be used to configure which one of the plurality of potential policies should be associated with the text input field.

The policy associated with the text input field may allow the publishing user node to define an encoding method for encoding the text input at the text input field.

The electronic document may be a webpage provided by a service provider. The service provider may be a social networking service provider. The text input may be a component provided by the publisher user node at the social networking webpage.

The process of encoding of electronic data may be applied to any content, such as video or image content. For instance, in response to detecting image or video content uploaded from a publishing user node, a policy may be assigned that is associated to the detected content. A unique identifier may be assigned to the detected content. A key may be obtained for encoding the detected content. In response to obtaining the unique identifier and the key for encoding the detected content, the detected content may be replaced with encoded versions of the content.

A computer program product for encoding electronic data published by a user node may be provided. The computer program product may include code that is configured such that when it is executed on a terminal it intercepts the processing of an electronic document to identify one or more text input fields. The code may configure the terminal (processor) to respond to the detection of text input at one of the text input fields in the document by assigning a policy to the text input field. The code may configure the processor to respond to the receipt of a unique identifier assigned to the text input field and a key for encoding the text at the text input field by replacing the text input with the encoded text.

A publishing node may include one or more computer processors that is configured to intercept the handling of contents of an electronic document by causing a search for one or more text input fields in portions of the contents of the electronic document. In response to the detection of text input at a text input field in the contents of the electronic document, a policy associated with the text input field may be assigned. A unique identifier assigned to the text input field and key for encoding the text input at the text input field may be obtained by the publishing node. The publishing node may respond to obtaining the unique identifier and the key by encoding the text input and replacing the text input with encoded text.

Systems, methods and computer program products may be provided for facilitating a policy node with decoding and encoding of electronic data. A unique postable item may be obtained by a policy node from a publishing node. The policy node may respond to obtaining the unique postable item by (i) generating a decoding key for decoding the postable item, and (ii) assigning a policy to the postable item. The policy may define the conditions on which the postable item is accessible to one or more of viewing nodes. The policy node may respond to a request form a viewing node to decode the postable item by determining whether the requesting viewing node satisfies the terms of the policy.

A decoding key for decoding the postable item into cleartext may be generated by the policy node. The policy node may transmit the decoding key to a node requesting access to view a decoded version of the postable item if the requesting node satisfies the terms of the policy. In another embodiment, the publishing node may generate the decoding key for decoding the postable item into cleartext.

Systems, methods and computer program products may be provided for decoding electronic data a viewing user node. A user node that is processing an electronic document having encoded text may be detected. In response to the detection of the encoded text, control of at least a portion of the electronic document may be intercepted. A tag (identifier/ID) for the encoded text may be identified. A policy associated with the ID may be requested from a policy node. If the terms of the policy are satisfied, a decode key from the policy node may be received. In response to receiving the decode key, the encoded text may be replaced with clear text at the user node.

In order to incept a portion of the electronic document, the method/system/computer program product may detect that a host application executed by a computer processor is about to load the electronic document. In response, a Document Object Model (DOM) associated with the electronic document may be processed. Portions of the DOM may be modified/transformed to replace the encoded text with cleartext.

Systems, methods and computer program products for encoding electronic data published by a user node using tokens may be provided. The contents of an electronic document may be processed to identify one or more text input fields. In response to detecting text input at a text input field identified in the document, the detected text input may be replaced with a token. The detected text input may be stored at another node, such as a storage node.

BRIEF DESCRIPTION

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 9 is an example screenshot of a portion of an electronic document having encrypted posts/comments according to an optional embodiment of the invention.

DETAILED DESCRIPTION

A description of example embodiments follows.

The teachings of all patents, published applications and references cited herein are incorporated by reference in their entirety.

System Architecture

Figure 1:
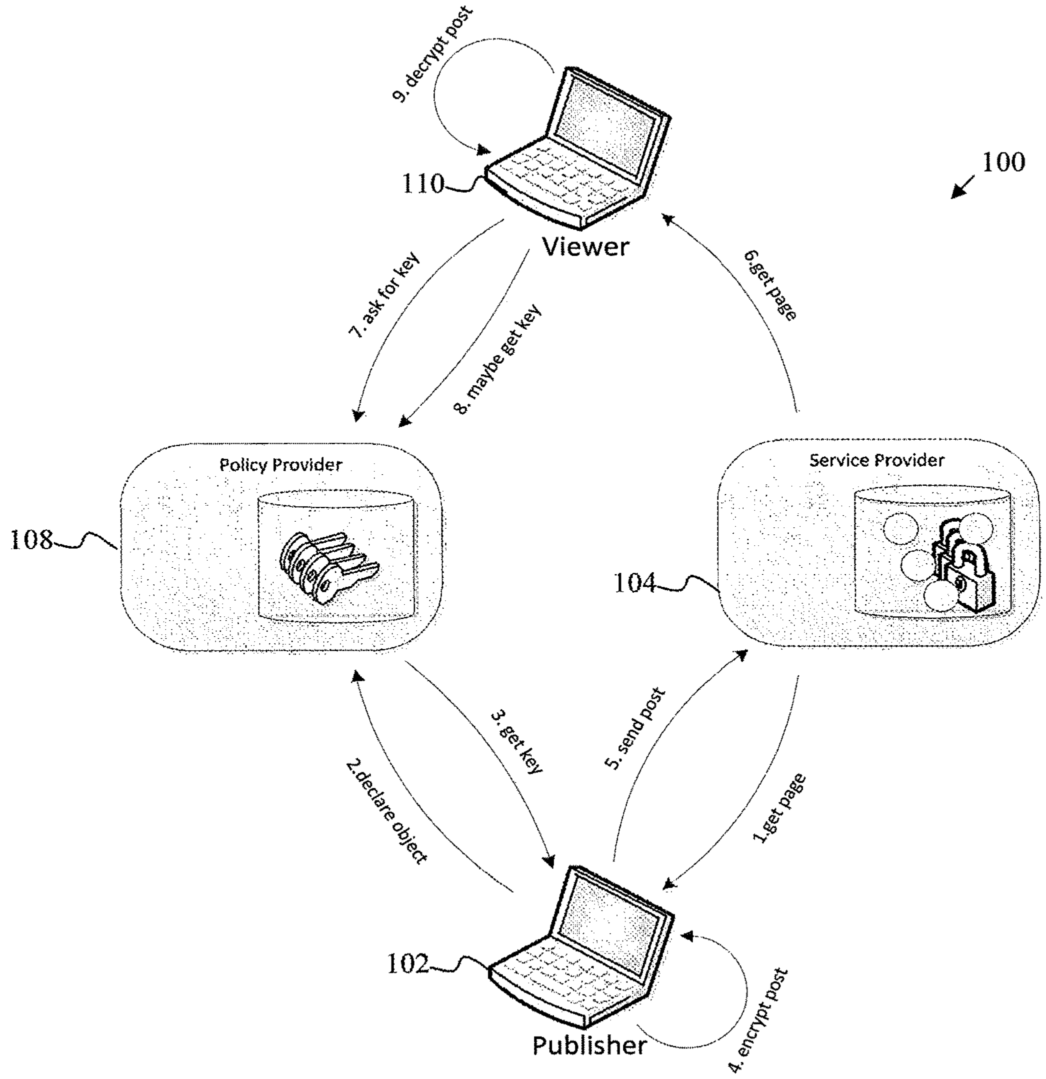
FIG. 1 is a flow diagram showing the interaction between example system components according to an optional embodiment of the invention.

Example features of embodiments disclosed herein may be implemented in a software or hardware environment. One such environment is shown in FIG. 1. In this example, a system 100 is provided for encoding/decoding information. A publisher node 102 can access an electronic document (e.g. webpage, website) using a browser. The publisher node 102 can be, for example, operated by a user who posts information at a webpage. The webpage may be hosted/provided by an online service provider 104. The online service provider 104 can be, for example, any website or service, including any online service provider that enables users to post/share/upload information. The online service provider may provide any type of web-based content creation and management system that a user can interact with. For example, the online service provider 104 may be a site that allows users to publish information/comments. The online service provider may provide social networking, news, blogging, podcast, product review, search services, recommendation systems, or other types of services.

Publishing

When the webpage is requested from the service provider 104, the browser collects all the images (including the page structure) and stores this data in the browser cache. The browser renders the webpage and, before the browser draws the page such that it would be visible on the display of the publisher node 102, it raises an event indicating that the browser is about to draw the page. The inventive system 100 includes a browser plugin 300 that provides a listener, which listens for this event to detect when the browser is about to draw the page.

Figure 2:
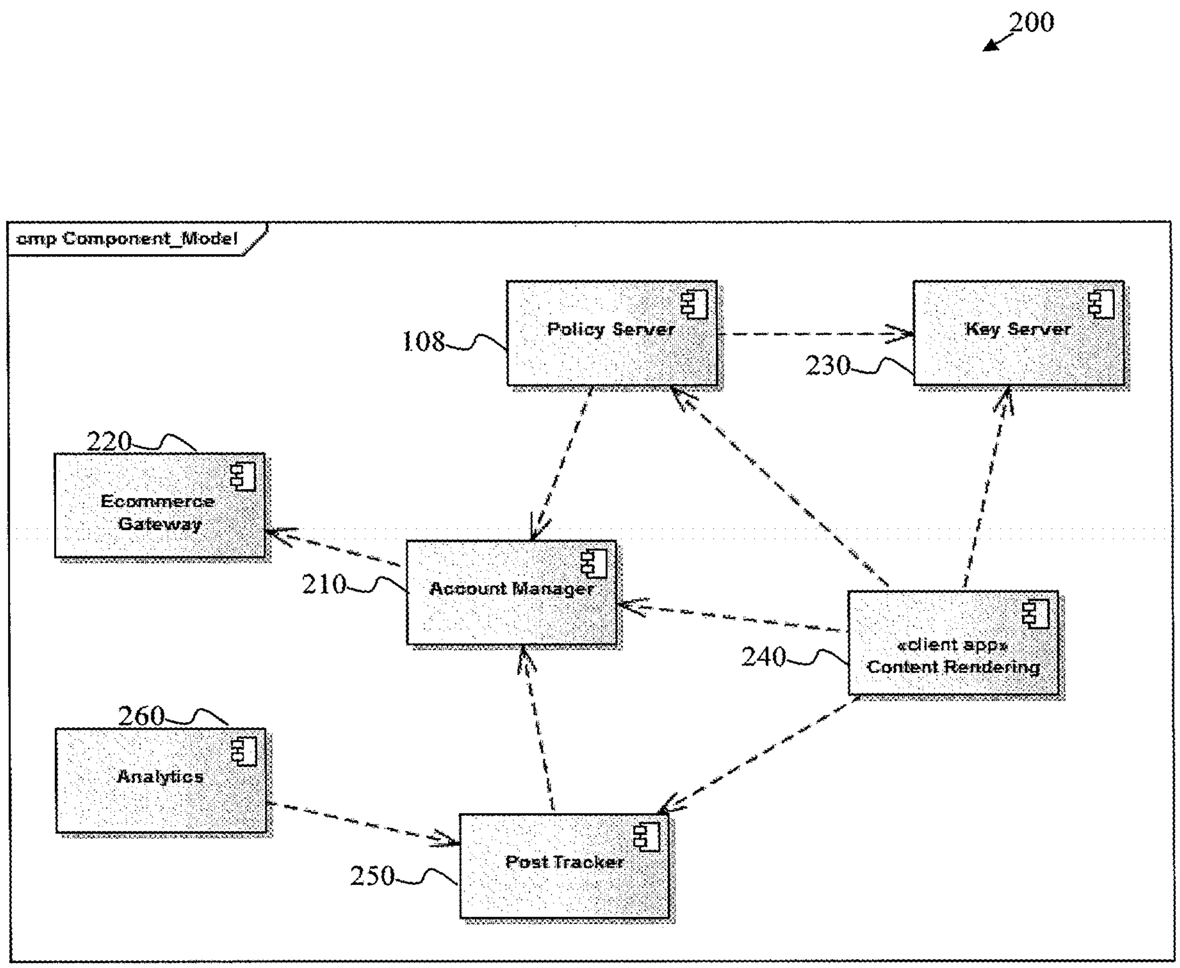
FIG. 2 is a block diagram showing example components according to an optional embodiment of the invention.

Referring to FIGS. 1-3, as the webpage that is requested by the publisher 102 is rendering at the browser, the system 100 parses the webpage content for text input fields (e.g. text input entry boxes or forms). For example, processes, which may be implemented in a component, such as a browser plugin 300, are executed at the user/publisher's computer, to process the content of the webpage in order to detect one or more text input fields in the webpage content. Thus, in response to detecting that the browser is about to draw the page at the publisher node 102, the plugin 300 intercepts control of the page from the browser. The parser 310 then processes the page to detect text input fields. The parser 310 identifies all the text input fields on the page and loops through each field.

The plugin 300 assigns a unique post ID/tag and an event handler (e.g. an onChange event/blur event handler) to each text input field identified. The onChange event can be fired when the content of a text input field changes. The handlers that are assigned to each text input field are added to the webpage's document object model (DOM). Once the unique post IDs and event handlers have been assigned to the text input fields, control is then passed back from the plugin 300 over to the browser and, the webpage is allowed to be drawn by the browser. Once the browser has resumed control over the webpage, the browser plugin 300 monitors the webpage and its associated contents in the background, waiting for the onChange events to be fired. The plugin 300 monitors the page to detect the situation where the publisher 102 inputs cleartext into a text input field on the webpage and then the system 100 responds by encoding/encrypting the cleartext input.

Figure 6:
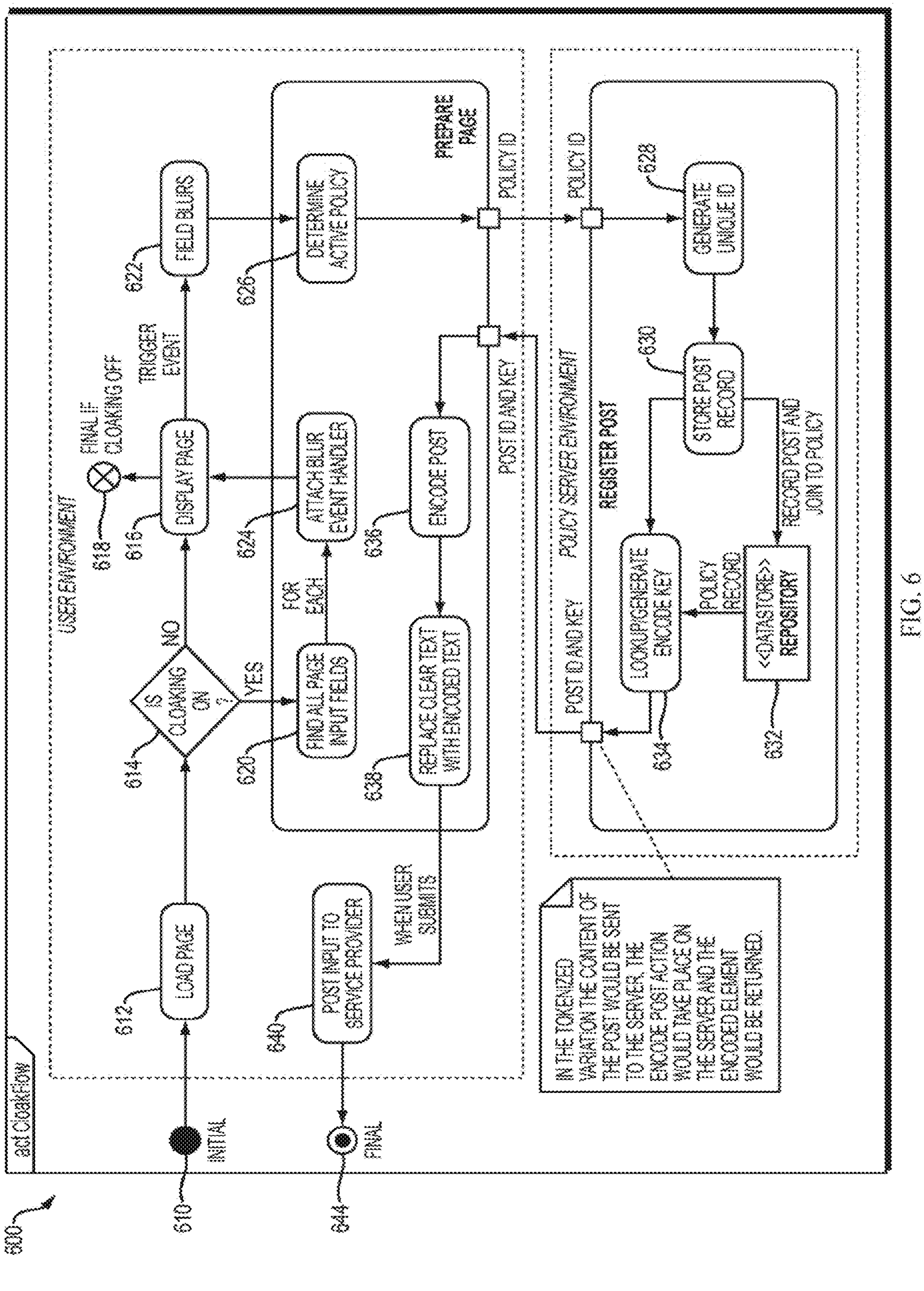
FIG. 6 is a flow diagram showing an example process of encoding cleartext according to an optional embodiment of the invention.

FIG. 6 is a flow diagram showing the process 600 of encoding cleartext (e.g. a post/comment) according to an embodiment. At 612, the page is loaded, and at 614 the system 100 determines whether cloaking (encryption/encoding) is enabled. If encoding is disabled, then at 616 the webpage is displayed without any encryption/encoding. If encoding is, however, enabled then the page is parsed at 620 to detect its text input fields. An event handler is attached to each of the text input fields at 622, and the page is displayed at 616. Events (onChange events) are assigned to each text input field and are added to the webpage's document object model (DOM).

At 622, the onChange event is fired when the content of a text input field changes (e.g. the field blurs). Specifically, once the plugin detects that the publisher's curser exits the field (e.g. loses focus/blurs), the onChange event is fired and detected by the event handler. In response to detecting an onChange event, at 626 components of the system 100 determine an active policy associated with the text input field. The policy server 108 receives the unique identifier and key and, in response, generates three pieces of information (ID for post 628, key for decrypting the post, and a link to a preexisting policy for decryption). The policy is a collection of terms that need to be satisfied.

At 630 and 632, the policy server 108 stores the cleartext, the assigned key, and the post ID associated with that text input field. The post ID and key are stored at the policy server 108. Return control back to the browser. At 636-640, the cleartext (e.g. unencrypted text) is replaced with the encrypted text and the post ID. In response, the browser is instructed to draw that portion of the page (at the location of the text input field) with the encrypted text. The user(s), e.g. the publisher 102 (and any viewer(s) 110), will see encrypted text once it is posted.

In this way, each text input field detected represents a unique postable item and for each text input field detected, a unique identifier/tag is assigned and a key is generated that is associated with that identifier, which can enable the system 100 to identify that field and encrypt content input in that field.

Viewing

Figure 8:
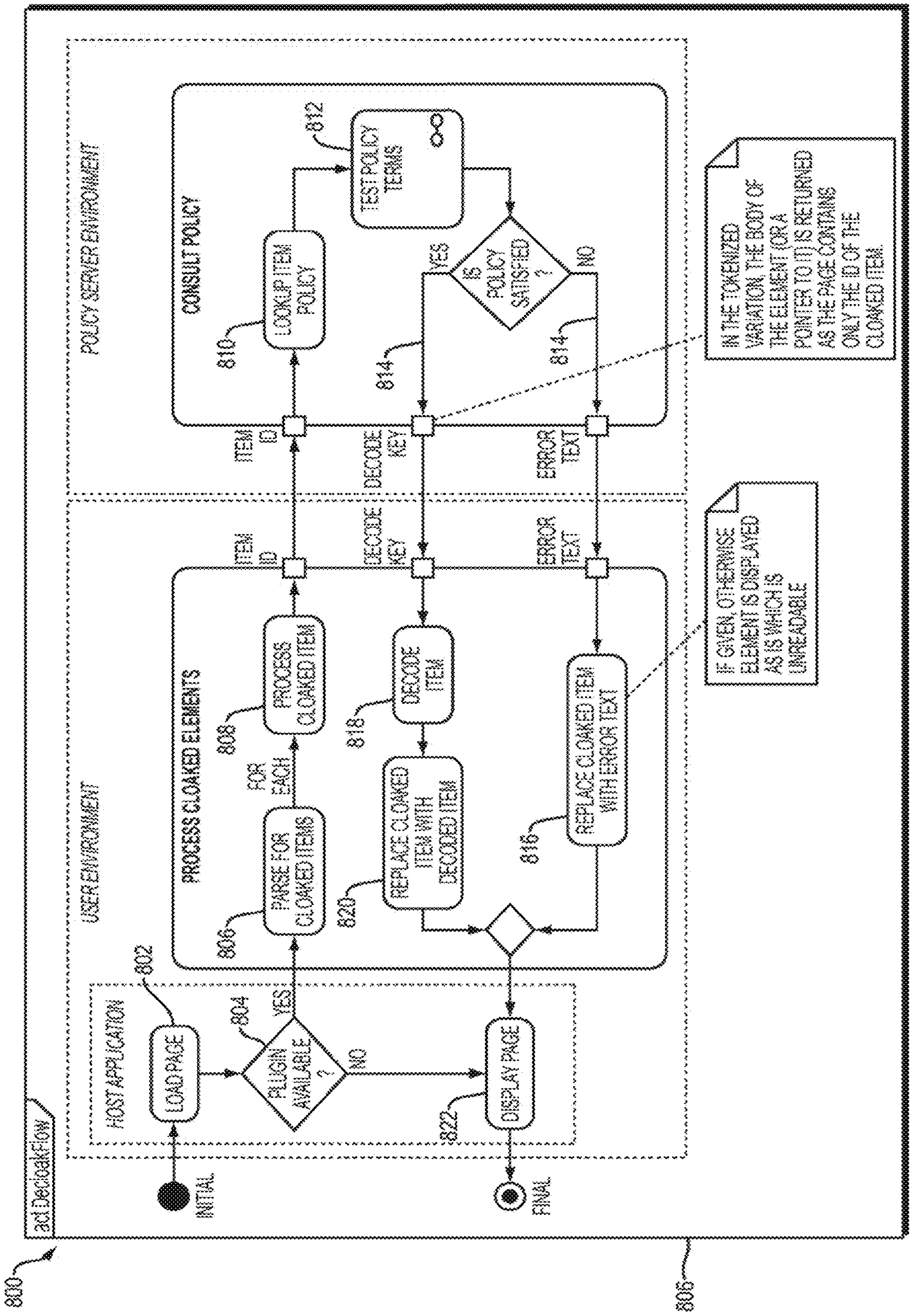
FIG. 8 is a flow diagram showing an example of the process of decoding encoded content according to an optional embodiment of the invention.

With publishing (encrypting cleartext), the browser fires the event and the listener detects the event. With viewing the page at, for example, a viewing node 110, this occurs in reverse in that the listener is fired before the page is drawn/rendered by the browser. Instead of searching for text input fields as described in FIG. 6, components of the system 100 (e.g. the parser 312) process the page to detect cloaked items. Referring to FIG. 8, for example, if the plugin 300 is available at 804, the page is processed at 806 to detect a collection of characters that identifies a tag for an encrypted post (e.g. to detect a cloaked or encoded item 808). Once the parser 312 detects the tag/encoded item, it finds a post ID, and looks up the policy associated with the item at 810.

The system tests the policy's terms at 812. For example, the system looks up the policy associated with the post and processes the terms of the policy to try to come up with a true/false. For example, the policy server may consider whether the user computer node attempting to view the page with the encrypted content is located the US. The policy server may also consider whether the viewing computer node is associated with a particular email address. If the terms of the policy are satisfied at 814, then the decoding key is sent to the viewing node 110 so that the encoded item may be decoded at 818. At 820, the encoded text (cloaked text or tag) is replaced with the clear text and the page is displayed by the viewing node 110 at 822. If the terms of the policy are not satisfied, then at 814 the error text is displayed. Specifically, at 816 the cloaked item is replaced with the error text. The error text may be any kind of content. For example, the error text may be content that is displayed as unreadable; it can be advertisements, an image, a URL, or defined text, e.g. "I do not like you." The error text may be customized content provided by the publishing node 102. FIG. 9 is an example screenshot of a portion of an electronic document 900 having encrypted posts/comments 902, which are shown as unreadable.

It should be noted that in one example of the tokenized embodiment, instead of displaying the error text, the body of the element (or a pointer to it) is returned since the page contains the id of the cloaked item.

Example Content Rendering Components

Figure 3A:
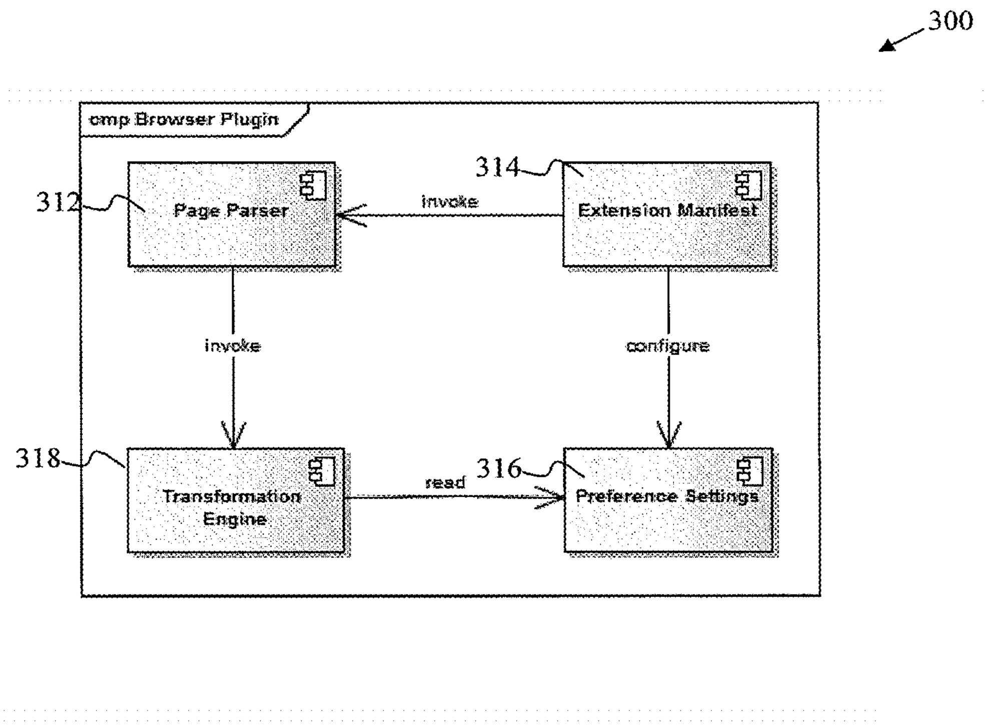
FIG. 3A is a block diagram showing example components of a browser plugin according to an optional embodiment of the invention.

FIG. 3A is a block diagram showing example components of a browser plugin 300 according to an optional embodiment of the invention. The plugin 300 may include a parser 312, an extension manifest component 314, a transformation engine 318, and a preference settings component 316. The parser 312 may be used to process a webpage to detect any unique postable item (e.g. text input fields or other image/video content for encoding—publishing) and to parse the webpage for encrypted/encoded/tagged text (viewing). The unique postable item/content may be any user-entered and user-controlled text/image/video that is to be cloaked/encrypted/encoded.

The extension manifest 314 may provide a specific structure for the browser that enables events to be declared. For example, an onload event handler can be defined that detects when the electronic document/webpage is loaded (e.g. detects when an onload event is fired); in this way, the plugin 300 can detect when the webpage is being loaded so that it can process the page for text input fields or other fields that allow for the creation of unique postable items. The transformation engine 318 may facilitate changing cleartext into encrypted/encoded/tagged text (or unencoded content into encoded content).

Figure 10A:
FIG. 10A is an example screenshot of a toolbar for a browser interface in which a user may login to access encoding/decoding features according to an optional embodiment of the invention.
Figure 10B:
FIG. 10B is an example screenshot of a toolbar for a browser interface in which a user has logged in to access encoding/decoding features according to an optional embodiment of the invention.

The plugin 300 may include a toolbar interface for a browser. FIG. 10A is an example screenshot of a toolbar for a browser interface in which a user may login to access encoding/decoding features according to an optional embodiment of the invention. FIG. 10B is an example screenshot of a toolbar for a browser interface in which a user has logged in to access encoding/decoding features according to an optional embodiment of the invention. As shown in the plugin toolbar interface, the policy may be defined by selecting a policy from the drop down menu for "Policy". The displayed policy will be the one set as the default for the current site. By interacting with the toolbar and selecting the specific policy which is to be applied to the text input (or video/image content being uploaded by the user/publisher). The toolbar can allow the user (publisher) to specify whether or not the user wants to encrypt posts on the current webpage that the user is accessing. Thus, the plugin 300 can enable proactive transformation of the user's posts by allowing the user to specify whether they want to encrypt and, the plugin can enable reactive transformation of the user's posts by detecting a post and prompting the user to specify whether it should be encrypted.

The toolbar interface may be provided to facilitate encoding/decoding for the user environment (e.g. publishing/viewing). The publishing/viewing nodes may interact with a policy server environment to facilitate encryption/decryption of content by processing the terms of the policy.

Figure 3B:
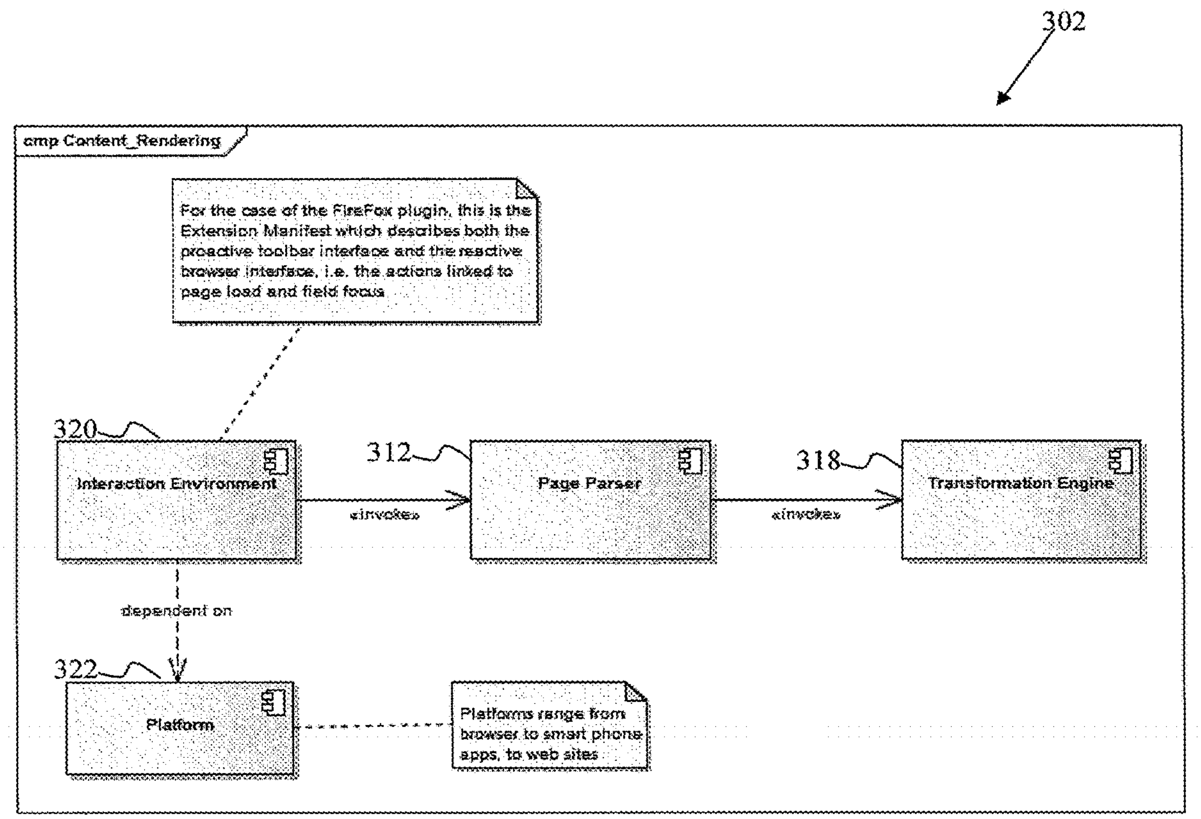
FIG. 3B is a block diagram showing example components of a content rendering environment according to an optional embodiment of the invention.

FIG. 3B is a block diagram showing example components of a content rendering environment 302 according to an optional embodiment of the invention. The interaction environment 320 may be any type of environment capable of handling/facilitating the processing of the encoding/decoding of information (e.g. comments or audio/visual content) posted on a service provider 104 in accordance with embodiments of the present invention. For example, the content rendering environment may include a plugin 300 executed by a processor, such as the plugin shown in FIG. 3A. The platform 322 for facilitating processing and implementation of the content rendering environment may include a browser, smartphone applications, websites, and the like.

FIG. 2 is a block diagram showing example components according to an optional embodiment of the invention. The account manager 210 may provide a collection of information about the various entities, e.g. the publisher 102, viewer 110, etc. Such information may include email addresses, account information, post history, sign in and authentication information, etc. The key server 230 stores encoding/decoding keys. Components of the system 100 (e.g. publisher 102, viewer 110, policy server 108) may interface with the key server to record and fetch keys.

The ecommerce gateway 220 may provide billing and invoicing services for the publisher 102 and viewer 110. The post tracker 250 records or tracks posts made by the publisher 102. The analytics 260 component facilitates analysis/reporting of the records recorded by the post tracker.

Policy Server Node

Figure 4:
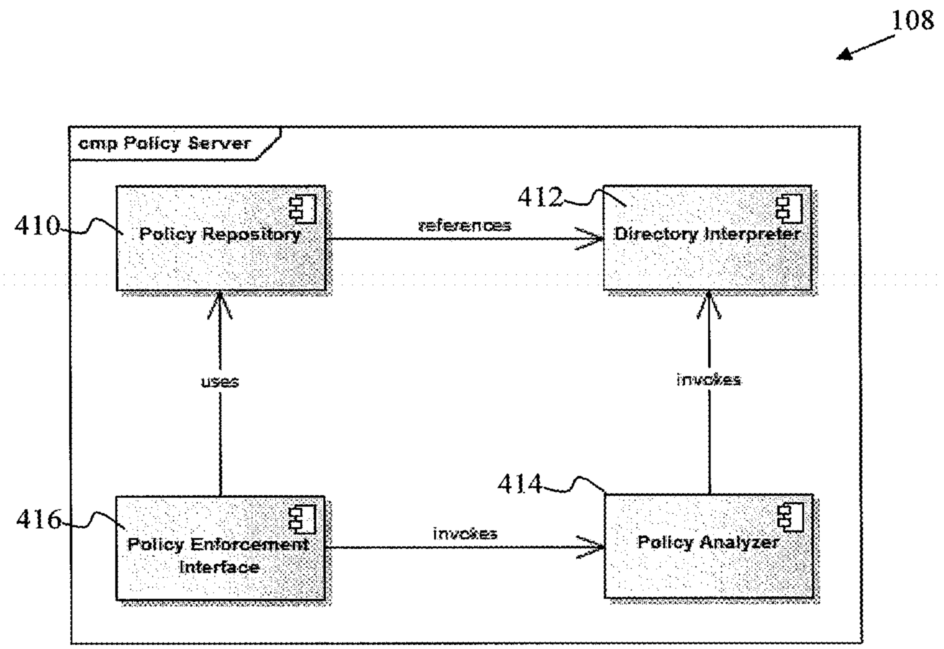
FIG. 4 is a block diagram of example components of a policy server according to an optional embodiment of the invention.

FIG. 4 is a block diagram of example optional components of the policy server 108. Policy repository 410 may provide a database storing policy terms. The terms of the policy may specify any access terms, for example, whether the user attempting to view the content is in the US; whether a specific browser (e.g. Firefox) is used by the user attempting to access the content; whether the user attempting to access is specifically excluded from access. For example, a publisher/user may have a policy specifying restricted access for a particular user (e.g. user B), such that everyone but User B is able to view the publishing node's posts.

The directory interpreter 412 can interface with other external components/directories to configure policy access terms for a post. The policy may be defined to deliver access to specific users identified in some third party system, such as a corporate directory or online contacts list and, the directory interpreter can be used to interface with these third party systems. For example, the publisher may want to restrict viewing access to the publisher's Facebook friends. The directory interpreter 412 may be used to help implement this portion of the policy by inputting (importing) the publisher's Facebook friends. In this way, group access can be created.

The policy enforcement interface 416 may be used to interface with the plugin 300 at the viewing/publishing node(s). For example, if a publishing node is attempting to encode a post, the plugin 300 may pass a post, an ID for the post, and a key to the policy enforcement interface 416 for processing at the policy node 108. In one example embodiment, the policy node 108 may be an automated key management server.

The policy node 108 may also confirm that a viewing node attempting to access contents of an encoded post meets the terms for the post ID associated with that item. If the terms are met, then the policy node 108 may return the key. If the terms are not met, then the request for the key may be denied. If the key is returned, then the encoded posts are swapped out for the cleartext at the viewing node. The encrypted text is therefore transformed into cleartext.

The policy may be configured so that viewer access is limited to viewers having a rendering environment that is a trustworthy. For example, if the policy node 107 is able to confirm that the viewing node is trustworthy, the policy node 107 can ensure that the decryption key is likely not to be compromised, stored or redistributed. For example, the viewing node may be considered trustworthy if it has a trusted hardware environment, such as a trusted platform module.

User Accounts

Figure 5:
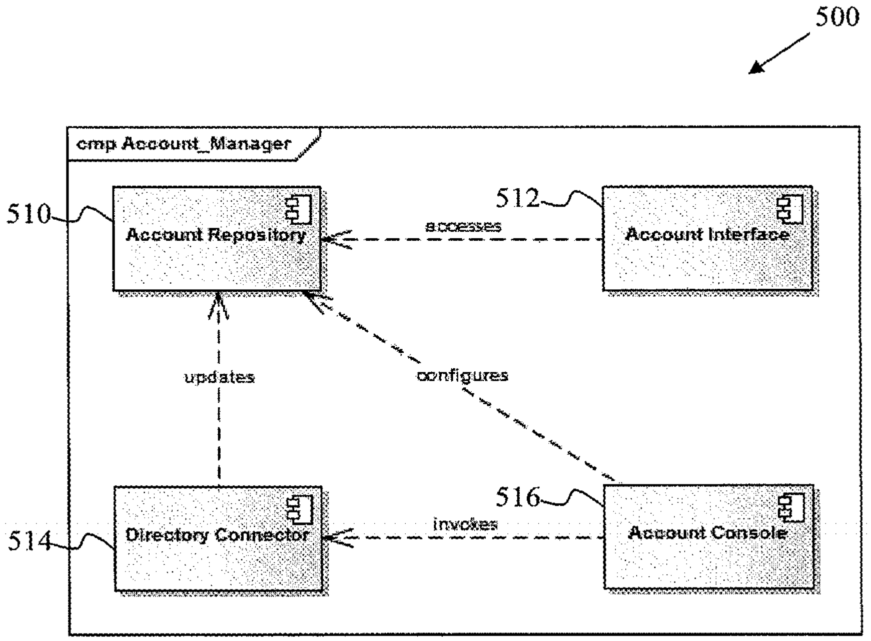
FIG. 5 is a block diagram of example components of an account manager according to an optional embodiment of the invention.

FIG. 5 is a block diagram of example components of an account manager 210, 500 according to an optional embodiment of the invention. New user/create account signup may be provided with an account management component 500, which interfaces 512 with the browser plugin 300. By setting up an account, a user can login, for example, using the login portion of the browser toolbar interface. Login credentials may be stored in the repository 510 and used to help manage identity of system users.

Transformation and Tokenization

There are a plurality of potential approaches to encoding the data. One example approach is transformation, which involves encoding the content prior to its posting to a third-party web service (service provider 104). In one embodiment, the plugin 300 may be designed with an open architecture platform so that third parties have the ability to insert their own transformation engine 318. Another potential approach is tokenization, which involves posting a pointer to the content and keep the content on the, for example, policy nodes/servers (or somewhere else).

With transformation, one uses a scheme which can be resilient as the external web service 104 will handle the data like normal text and try to format it. One benefit to transformation is that policy server (or other system) may be configured so that it is not responsible for storing the post and, therefore, it is not responsible for all the data storage.

With tokenization, an external site receives an id, and that id provides a pointer to the encoded (tokenized) content, which can be stored at another node (e.g. a storage node, the policy server node, or on another system, such as a peer-to-peer network). One example benefit with tokenization is that the content may be individually managed; for example, an unwanted post may be easily removed by deleting the pointer (token). In one example preferred implementation, one would apply encryption to the content before it is uploaded to another node to provide additional safeguards to protect the data.

In some implementations, tokenization may be more resistant to cryptanalysis, such as to attacks. For example, the crypto may be more difficult to guess since one would not need to maintain size and word structure. Further, the integrity of the content would likely be complete (e.g. provided that the external server returns back the entire ID, since half an ID string may be inefficient.)

Further, with tokenization, implementation may be provided without modifying existing browser systems. Therefore, browsers can encode/decode using the tokenization approach with or without a plug-in interface.

A variation on tokenization may involve embedding an ID in English. A paragraph long sequence of real words, for example, may provide enough variation to represent a unique ID. With this configuration, it is possible that the token may be undetectable by external servers.

Removing Content

Figure 7:
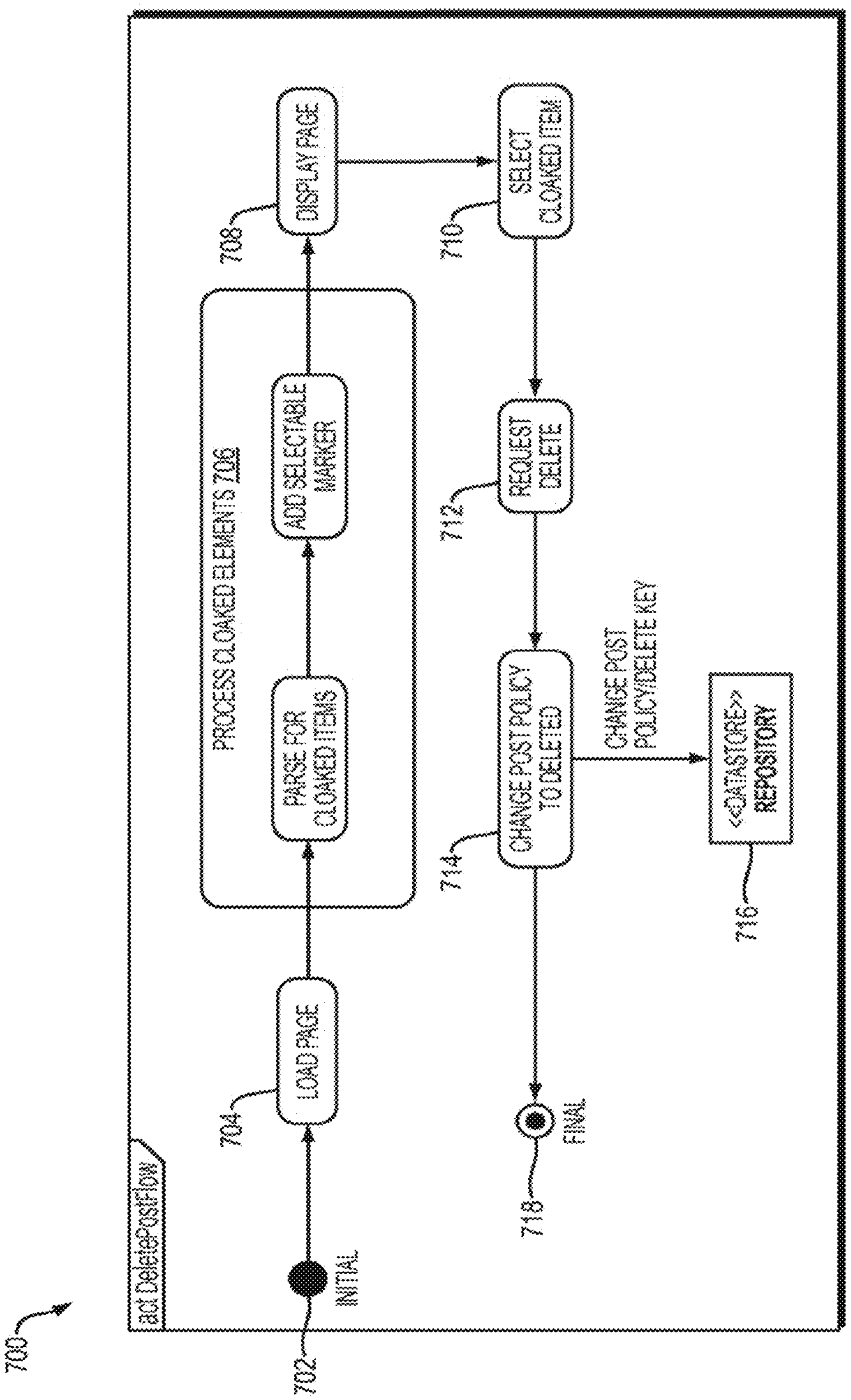
FIG. 7 is a flow diagram showing an example process of deleting a post according to an optional embodiment of the invention.

Users may be use the system 100 to ensure that they are able to uncloak content after the encoded version of the content has been posted to a web service 104. FIG. 7 is a flow diagram showing an example process of deleting a post according to an optional embodiment of the invention. At 704, the page is loaded and at 706 it is process for cloaked items and displayed 708. The user selects a cloaked item at 710, and requests to delete this item at 712. The policy is modified to reflect that that post is deleted at 714, and this information is stored in the repository 716.

Figure 11:
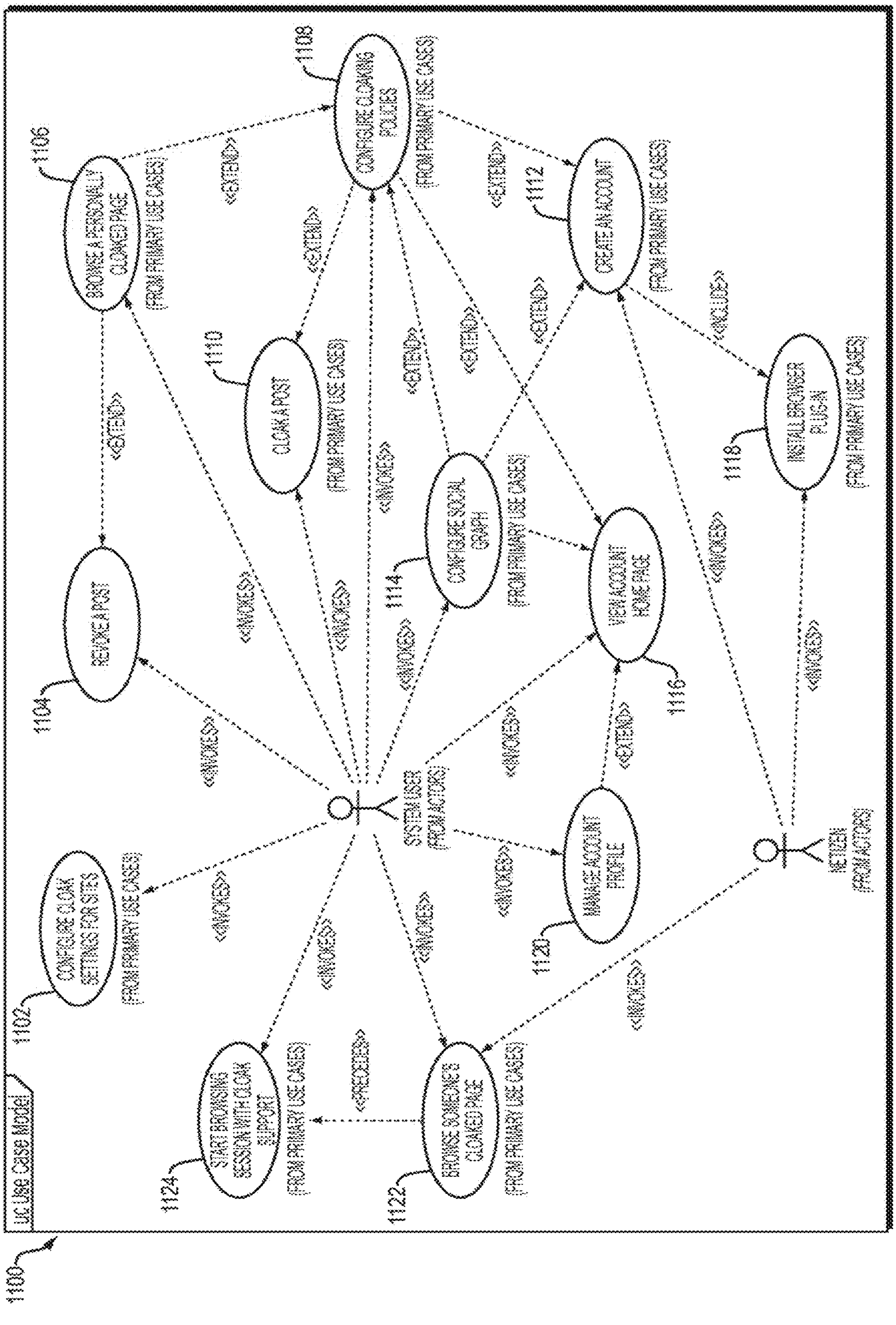
FIG. 11 is an example use case diagram of the users (actors) according to an optional embodiment of the invention.

FIG. 11 is an example use case diagram of the example users (actors) of the system 100 and the different functions/uses of the system 100 that they can perform. In this example, a user is able to do several functions in the system 100: browse with cloak support 1124; configure cloak settings for external sites 1102; cloak a post 1110; revoke a post 1104; browse with cloak support (plugin support) 1124; browse a page that has been cloaked been cloaked by the user 1106; configure cloaking policies 1108; create an account 112; configure social graph 114 (configure groups and relationships between viewers that are granted/denied access, etc.); manage their profile 1120; browse someone else's cloaked page 1122; install the browser plugin 1118.

Mobile Agent Implementations

A mobile agent implementation of the invention may be provided. A client server environment on which to enable mobile security services including features of the invention. It uses, for example, the XMPP protocol to tether a background cloaking agent/client on the device to a server. The server can then issue commands to the phone on request.

Self-Encrypting Hard Drives

Embodiments of the security/cloaking schemes of the inventions may be implemented using self-encrypting drives. Such security schemes may be used to help protect against data loss due to a lost or stolen PC. The Trusted Drive Manager software activates the security that distinguishes a self-encrypting drive from a standard hard drive. Examples of such technology are described in, for example, U.S. Pat. Nos. 7,036,020 and 7,426,747, the entire contents of which are incorporated herein by reference.

Processing Environment

Figure 12:
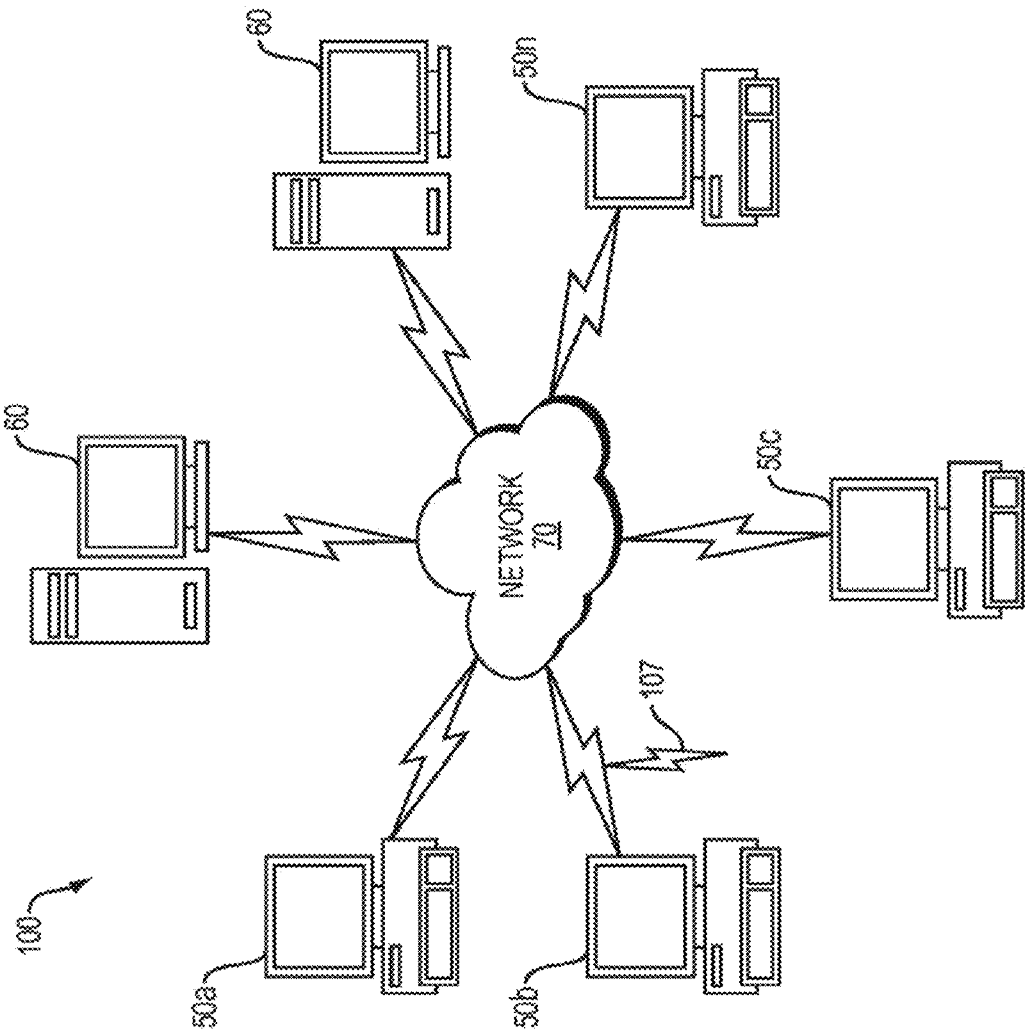
FIG. 12 illustrates an example computer network or similar digital processing environment in which the present inventions may be implemented.

FIG. 12 illustrates an example computer network or similar digital processing environment in which the present inventions may be implemented. The viewer nodes 110 or publisher nodes 102 may be client computer(s)/devices 50*a, b* . . . *n* (50 generally) and the policy provider 108 and service provider 104 may be server computer(s) 60 that provide processing, storage, and input/output devices executing application programs and the like. The viewer 110 and publisher 102's client computer(s)/devices 50 can also be linked through communications network 70 to other computing devices, including other client devices/processes 50 and server computer(s) 60. A communications network 70 can be part of a remote access network, a global network (e.g., the Internet), a worldwide collection of computers, Local area or Wide area networks, and gateways that currently use respective protocols (TCP/IP, Bluetooth, etc.) to communicate with one another. Other electronic device/computer network architectures are suitable.

Figure 13:
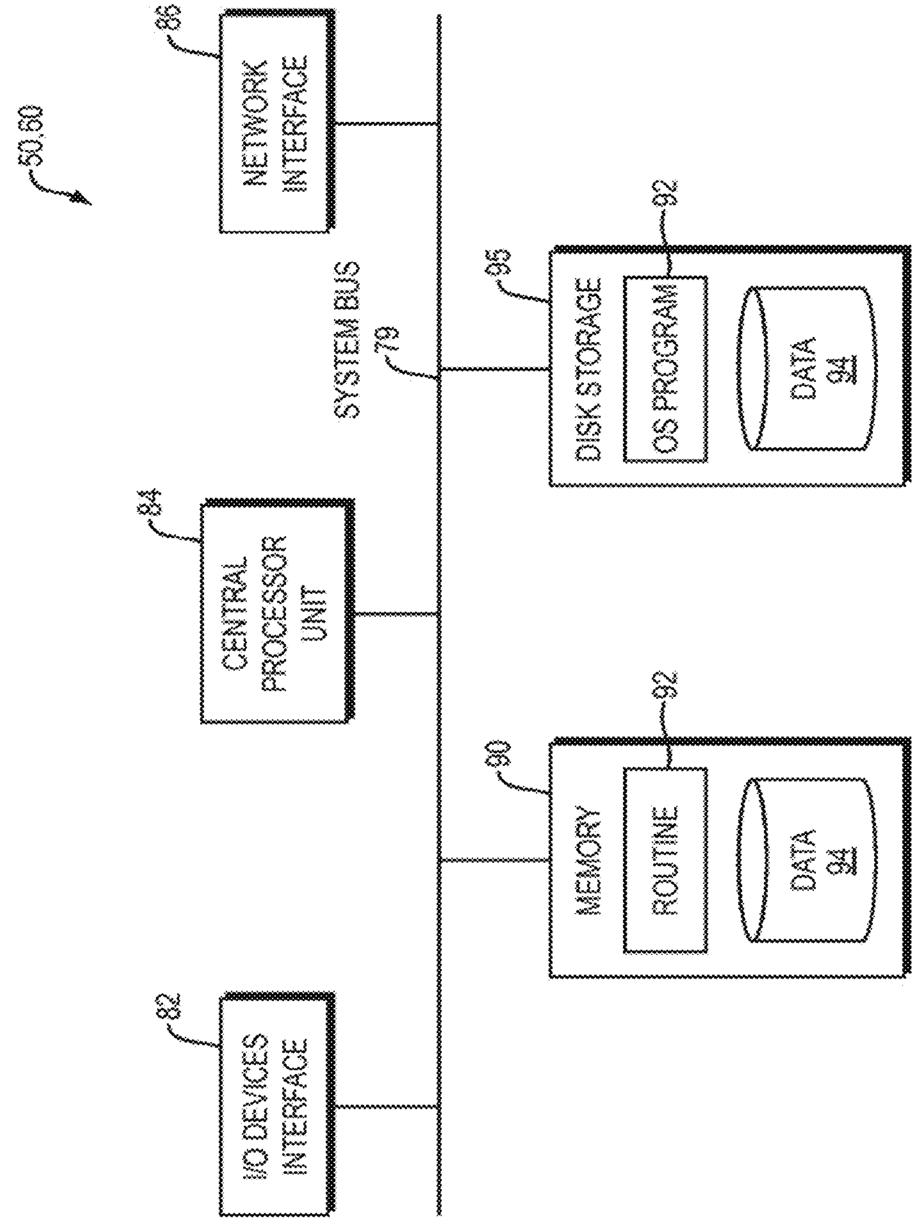
FIG. 13 is a block diagram of the internal structure of a computer of the network of FIG. 12.

Continuing from FIG. 12, FIG. 13 is a diagram of the internal structure of a computer (e.g., client processor/device 50 or server computers 60) in the computer system of FIG. 12. Each computer 50, 60 contains system bus 79, where a bus is a set of hardware lines used for data transfer among the components of a computer or processing system. Bus 79 is essentially a shared conduit that connects different elements of a computer system (e.g., processor, disk storage, memory, input/output ports, network ports, etc.) that enables the transfer of information between the elements. Attached to system bus 79 is I/O device interface 82 for connecting various input and output devices (e.g., keyboard, mouse, displays, printers, speakers, etc.) to the computer 50, 60. Network interface 86 allows the computer to connect to various other devices attached to a network (e.g., network 70 of FIG. 1). Memory 90 provides volatile storage for computer software instructions 92 and data 94 used to implement components of the encoding/decoding features of the present inventions. Disk storage 95 provides non-volatile storage for computer software instructions 92 and data 94 used to implement an embodiment of the present invention. Central processor unit 84 is also attached to system bus 79 and provides for the execution of computer instructions.

In one embodiment, the processor routines 92 and data 94 are a computer program product (generally referenced 92), including a computer readable medium (e.g., a removable storage medium such as one or more DVD-ROM's, CD-ROM's, diskettes, tapes, etc.) that provides at least a portion of the software instructions for the invention system. Computer program product 92 can be installed by any suitable software installation procedure, as is well known in the art. In the context of this document, a computer readable storage medium may be any tangible medium that can contain, or store a program for use by or in connection with an instruction execution system, apparatus, or device. In another embodiment, at least a portion of the software instructions may also be downloaded over a cable, communication and/or wireless connection. In other embodiments, the invention programs are a computer program propagated signal product 107 embodied on a propagated signal on a propagation medium (e.g., a radio wave, an infrared wave, a laser wave, a sound wave, or an electrical wave propagated over a global network such as the Internet, or other network(s)). Such carrier medium or signals provide at least a portion of the software instructions for the present invention routines/program 92.

In alternate embodiments, the propagated signal is an analog carrier wave or digital signal carried on the propagated medium. For example, the propagated signal may be a digitized signal propagated over a global network (e.g., the Internet), a telecommunications network, or other network. In one embodiment, the propagated signal is a signal that is transmitted over the propagation medium over a period of time, such as the instructions for a software application sent in packets over a network over a period of milliseconds, seconds, minutes, or longer. In another embodiment, the computer readable medium of computer program product 92 is a propagation medium that the computer system 50 may receive and read, such as by receiving the propagation medium and identifying a propagated signal embodied in the propagation medium, as described above for computer program propagated signal product.

Generally speaking, the term "carrier medium" or transient carrier encompasses the foregoing transient signals, propagated signals, propagated medium, storage medium and the like.

Any combination of one or more computer readable medium(s) may be utilized. The computer readable medium may be a computer readable signal medium or a computer readable storage medium.

Computer program code for carrying out operations for aspects of the present invention may be written in any combination of one or more programming languages, including JavaScript, XML, Java, Smalltalk, C++, C# or the like and conventional procedural programming languages, such as the "C" programming language or similar programming languages. The program code may execute entirely on the user's computer as a browser plugin, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed.

While this invention has been particularly shown and described with references to example embodiments thereof, it will be understood by those skilled in the art that various changes in form and details may be made therein without departing from the scope of the invention encompassed by the appended claims. The terminology used herein was chosen to best explain the principles of the embodiments, the practical application or technical improvement over technologies found in the marketplace, or to enable others of ordinary skill in the art to understand the embodiments disclosed herein. For example, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Further, although Unified Modeling Language (UML) drawings (e.g. use case diagrams, etc.) have been used in some of the figures to model and/or describe example features of the inventions described herein, these drawings are for purposes of illustration and do not constrain the implementation of the inventions to any particular hardware or software implementations.

The service provider 104 can be, for example, any type of service provider that hosts electronic documents. Example service providers may include news/media service providers, such as CNET, or any social networking service providers, such as Facebook, Twitter, LinkedIn, and the like. Furthermore, although some figures have been described with reference to the viewer 110 and the publisher 102, one skilled in the art would understand that in some situations, the viewer 110 and the publisher 102 may be operated by the same user.

What is claimed is:

1. A system for decoding encoded electronic data published by a user node, the method comprising:

executing, by one or more processors of a first system, a program to cause the one or more processors to perform operations comprising:

obtaining a unique, encoded postable item, wherein the postable item is encoded by a second system performing operations comprising:

detecting, via a listener, when an executing browser is about to draw a third party webpage at the publishing user node;

in response to detecting that the third party webpage is about to be drawn, parsing the third party webpage for input at a form input field by:

parsing contents of the third party webpage to detect one or more form input fields;

in response to detecting input at a detected from input field in the third party webpage, assigning a policy ID associated with the detected form input field;

receiving a unique identifier assigned to the detected form input field and an encoding key for encoding the input of the detected form input field; and in response to receiving the unique identifier and the encoding key for encoding the input at the detected form input field, encoding the input by replacing the input with the encoded electronic data; and generating a decoding key to decode the encoded content;

receiving a request from a requesting node to view the encoded content;

determining whether the requesting node satisfies a policy correlated with the policy ID;

transmitting the decoding key to the requesting node if the requesting node satisfies the policy.

2. The system for decoding electronic data as in claim 1 wherein assigning the policy ID further includes assigning a policy associated with the form input field.

3. The system for decoding electronic data as in claim 2 wherein the response to detecting input at the form input field includes transmitting the policy ID to a policy node, the policy node responding by: generating the unique identifier assigned to the form input field; generating the encoding key for encoding the input at the form input field; and transmitting, to the publishing user's node, the unique identifier assigned to the form input field and the encoding key for encoding the form input field.

4. The system for decoding electronic data as in claim 1 wherein the form input field is identified by: processing a Document Object Model (DOM) associated with the third party webpage to identify the form input field; and responding to the identification of the form input field by attaching a change or blur event handler to the form input field.

5. The system for decoding electronic data as in claim 4 wherein the input is detected at the form input field by the event handler such that the event handler detects a change in a value associated with the form input field and the identified form input field loses focus.

6. The system for decoding electronic data as in claim 5 further including responding to the change event associated with the form input field losing focus by determining the policy associated with the form input field.

7. The system for decoding electronic data as in claim 1 wherein the policy is a set of terms to be satisfied by a viewing user node attempting to access the page in order to receive access to a decoded version of the encoded content.

8. The system for decoding electronic data as in claim 7 wherein if the viewing user node accesses the third party webpage and the terms of the policy are not satisfied by the viewing user node, replacing the encoded content with substitution content at the viewing user node.

9. The system for decoding electronic data as in claim 7 wherein the publishing user node customizes the substitution content.

10. The system for decoding electronic data as in claim 7 wherein if the terms of the policy specify that the viewing user node is permitted access, replacing the encoded content with cleartext.

11. The system for decoding electronic data as in claim 7 wherein the terms of the policy include one or more of the following that need to be satisfied by the viewing user node: defining a group of users that are granted access to the cleartext, where if the viewing user node is a member of the access group, the viewing user node is granted access to the cleartext; or defining a group of users which are denied access to the cleartext, where if the viewing user node is a member of the access denied group, the viewing user node is denied access to the cleartext.

12. The system for decoding electronic data as in claim 7 wherein the terms of the policy specify an expiration date for providing access to the cleartext.

13. The system for decoding electronic data as in claim 7 wherein the terms of the policy specify a geographic location associated with the operating location of a viewing user node in which access to the cleartext is granted or denied.

14. The system for decoding electronic data as in claim 7 wherein the terms of the policy specify a minimum age or a maximum age of a user associated with the viewing user node to enable access to the cleartext.

15. The system for decoding electronic data as in claim 7 wherein the terms of the policy require the viewing user node to be verified as trustworthy by a machine health monitoring system to enable access to the cleartext.

16. The system for decoding electronic data as in claim 7 wherein the terms of the policy require the viewing user node to provide a passphrase to enable access to the cleartext.

17. The system for decoding electronic data as in claim 16 wherein the terms of the policy require the viewing user node to meet a specified level of cryptographic capability in order to protect access and use of a decoding key for decoding the encoded content.

18. The method of-encoding electronic data as in claim 1 wherein the third party webpage is a webpage hosted by a social networking provider and the input is a comment provided by the publishing user node at the social networking webpage.

19. The system for decoding electronic data as in claim 1 wherein the publishing user node selects, from a plurality of potential policies, which policy is associated with the form input field by selecting a style for the form input field.

20. The system for decoding electronic data as in claim 19 wherein the publishing user node selects a style for the form input field, the selected style defining a background color, where the defined background color specifies which one of the plurality of potential polices is associated with the form input field.

21. The system for decoding electronic data as in claim 1 wherein the postable item is encoded by the second system performing further operations comprising:

in response to detecting image or video content at the form input field uploaded from the publishing user node, assigning a policy associated with the detected content; obtaining a unique identifier assigned to the detected content and a key for encoding the detected content; in response to obtaining the unique identifier and the key for encoding the detected content, encoding the detected content by replacing the detected content with the encoded content.

22. The system for decoding electronic data as in claim 1 wherein the policy associated with the form input field allows the publishing user node to define an encoding process associated with encoding the input at the form input field.

* * * * *